United States Patent
Ivan et al.

(10) Patent No.: US 8,624,198 B2
(45) Date of Patent: Jan. 7, 2014

(54) NEUTRON DETECTION SYSTEMS WITH RADIATION PORTAL MONITORS

(75) Inventors: Adrian Ivan, Niskayuna, NY (US); Brent Allen Clothier, Clifton Park, NY (US); Daniel Bruno McDevitt, Galway, NY (US)

(73) Assignee: General Electric Company, Niskayuna, NY (US)

(*) Notice: Subject to any disclaimer, the term of this patent is extended or adjusted under 35 U.S.C. 154(b) by 1117 days.

(21) Appl. No.: 12/579,894

(22) Filed: Oct. 15, 2009

(65) Prior Publication Data
US 2011/0089332 A1 Apr. 21, 2011

(51) Int. Cl.
*G01T 3/06* (2006.01)
*G01T 3/00* (2006.01)

(52) U.S. Cl.
USPC ................... 250/390.11; 250/390.12

(58) Field of Classification Search
USPC ......................... 250/390.11, 390.12
See application file for complete search history.

(56) References Cited

U.S. PATENT DOCUMENTS

| | | | |
|---|---|---|---|
| 4,829,185 A * | 5/1989 | Cerff ........................ | 250/361 R |
| 5,281,820 A * | 1/1994 | Groh et al. .................... | 250/368 |
| 5,289,510 A | 2/1994 | Mihalczo | |
| 5,481,114 A | 1/1996 | Daniel et al. | |
| 5,880,471 A | 3/1999 | Schelten et al. | |
| 7,164,138 B2 | 1/2007 | McGregor et al. | |
| 7,326,933 B2 | 2/2008 | Katagiri et al. | |
| 7,335,891 B2 | 2/2008 | Kniss et al. | |
| 7,372,040 B2 | 5/2008 | Polichar et al. | |
| 7,501,077 B1 | 3/2009 | Hodges et al. | |
| 2005/0023479 A1 | 2/2005 | Grodzins | |
| 2007/0228284 A1 | 10/2007 | Polichar et al. | |
| 2008/0128628 A1 | 6/2008 | Moses et al. | |
| 2009/0140158 A1 | 6/2009 | Clothier et al. | |
| 2009/0200480 A1* | 8/2009 | Clothier et al. .......... | 250/390.01 |
| 2010/0038551 A1* | 2/2010 | Bell et al. .................. | 250/390.12 |

FOREIGN PATENT DOCUMENTS

| JP | 2008111677 A | 5/2008 |
|---|---|---|
| WO | 2008091357 A2 | 7/2008 |

OTHER PUBLICATIONS

J. Schelten, M. Balzhauser, F. Hongesberg, R. Engels and R. Reinartz; Abstract : A new neutron detector development based on silicon semiconductor and 6LiF converter; vols. 234-236, Jun. 2, 1997; Proceedings of the First European Conference on Neutron Scattering; 2 Pages abstract.

(Continued)

*Primary Examiner* — David Porta
*Assistant Examiner* — Mindy Vu
(74) *Attorney, Agent, or Firm* — Paul J. DiConza

(57) ABSTRACT

A neutron detection system comprising a radiation portal monitor is disclosed. The radiation portal monitor includes a neutron moderator sheet and a neutron-sensing panel and is configured to receive incoming neutrons through a neutron collection portal area. The neutron-sensing panel comprises a neutron-sensing material optically coupled to a plurality of optical fibers such that the neutron moderator sheet and the neutron-sensing panel are disposed substantially parallel to the neutron collection portal area.

17 Claims, 3 Drawing Sheets

(56) References Cited

OTHER PUBLICATIONS

Akiko Konnai, Naoteru Odano, Nobuteru Nariyama, Seiki Ohnishi, Nobuya Ozasa and Yuhzoh Ishikawa; Abstract : Neutron dosimetry with 6LiF-rich TL sheet; Radiation Protection Dosimetry 2006 120 (1-4):133-135; doi:10.1093/rpd/nci659; 2 Pages Abstract.

D.S. McGregor, S. Bellinger, D. Bruno, W.J. Mc Neil, E. Patterson, B.B. Rice; Perforated Semiconductor Neutron Detector Modules; 4 Pages, 2007.

Richard T. Kouzes, Edward R. Sciliano, James H. Ely, Paul E. Keller, Ronald J. McCom; Passive neutron detection for interdiction of nuclear material at borders ; Nuclear Instruments and Methods in Physics Research A 584 (2008) ; pp. 383-400.

Adrian Ivan, Brent Clothier, Daniel Bruno McDevitt; Integrated Neutron-Gamma Radiation Detector with Optical Waveguide and Neutron Scintillating Material; U.S. Appl. No. 12/027,828, filed Feb. 7, 2008.

* cited by examiner

To Photosensing Element

NEUTRON DETECTION SYSTEMS WITH RADIATION PORTAL MONITORS

CROSS REFERENCE TO RELATED APPLICATIONS

This application is related to co-pending U.S. patent application Ser. No. 12/027,828, entitled "Integrated neutron-gamma radiation detector with optical waveguide and neutron scintillating material," filed on 7 Feb. 2008 and U.S. patent application Ser. No. 11/949,423 entitled "Moldable neutron sensitive compositions, articles, and methods," filed on 3 Dec. 2007.

BACKGROUND

The invention relates generally to neutron detection systems, and more particularly to neutron detection systems with radiation portal monitors.

In view of current enhanced interest in the prevention of terrorist activity, there is a need for practical and sensitive neutron radiation detectors that can detect fissile materials and other sources of neutron radiation and distinguish them from the presence of medical and industrial radioisotopes and from normally occurring radioactive material. Detection of radioactive materials, particularly those illicitly hidden in the stream of commerce, requires fast screening equipment with neutron detection capability. Direct neutron detection capability has the following advantages over the widely present gamma-ray detection for neutron sources: better accuracy due to the extremely low neutron background and fewer sources of neutron emission in the normal flow of commerce and improved effectiveness because the shielding of otherwise detectable neutron sources may be more difficult than for gamma emitters.

A desirable neutron detector should demonstrate improved functionality and identification performance; it should be easily deployable, and have a low total cost of ownership. Currently used neutron detectors include gas proportional counters or liquid scintillators. Gas proportional counters commonly use a gaseous composition, such as helium-3 (a He isotope, denoted as $^3$He) or a boron-10 (a B isotope, denoted as $^{10}$B) containing gas, e.g., $^{10}$BF$_3$. In order to achieve suitable detection sensitivity, a large number of neutron-capture nuclides are needed. Due to the very low atomic density presented by the gaseous composition, a relatively large containment area and high pressures may be required to increase the effective interaction probability of the gaseous composition. The manufacturing and ownership costs of such large gas pressurized detectors can be extremely high. Further, pressurized gas containers are subject to federal code regulations for handling and transport and severely limit the portability of gas proportional counters. Liquid scintillators are also sensitive to gamma radiation leading to gamma ray interference.

Conventional neutron detection approaches using solid-state scintillation typically rely on the optical coupling of a neutron-sensing scintillator material composite to a flat window of a photosensor. However, some of the solid-state neutron-sensing scintillator detectors suffer from gamma-ray interference and others suffer from self-absorption of the emitted light and/or optical attenuation of the emission photons before detection.

In order to improve the total neutron sensitivity of the detector, an optimal neutron detector must address the issue of packaging a larger area of neutron-sensing composite and better transportation of the resultant light from the neutron-sensing composite without appreciable gamma-ray interference.

BRIEF DESCRIPTION

One embodiment of the present invention is a neutron detection system comprising a radiation portal monitor. The radiation portal monitor is configured to receive incoming neutrons through a neutron collection portal area. The radiation portal monitor includes a neutron moderator sheet or slab and a neutron-sensing panel. The neutron-sensing panel comprises a neutron-sensing material optically coupled to a plurality of optical fibers. The neutron moderator sheet and the neutron-sensing panel are disposed substantially parallel to the neutron collection portal area.

Another embodiment of the present invention is a neutron detection system, comprising a radiation portal monitor having a neutron-sensing panel that comprises neutron-sensing material filaments enclosed in an optical waveguide material; and a photo-sensing element optically coupled to the optical waveguide material such that the radiation portal monitor configured to receive incoming neutrons through a neutron collection portal area and the neutron moderator sheet and the neutron-sensing panel are disposed substantially parallel to the neutron collection portal area.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a neutron detection system with radiation portal monitors comprising moderators and neutron-sensing panels.

In the following specification and the claims that follow, the singular forms "a", "an" and "the" include plural referents unless the context clearly dictates otherwise.

Figure 1:
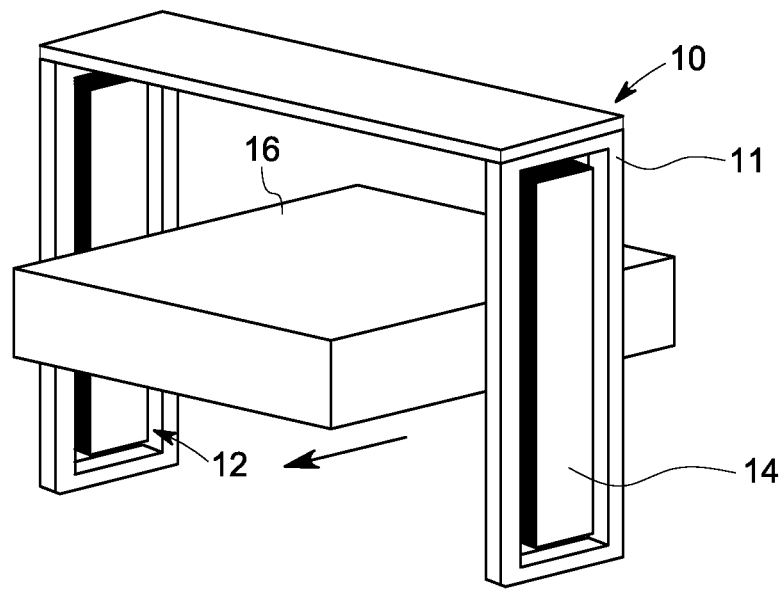
FIG. 1 is a diagrammatical representation of a neutron detection system comprising a radiation portal monitor in accordance with one embodiment of the invention.

FIG. 1 depicts a neutron detection system 10 with multiple radiation portal monitors 14 according to an embodiment of the invention. A radiation portal monitor is a substantially stationary radiation monitor, in contrast to a hand-held device, and is capable of detecting radiation from an object passing by a portal 12. As used herein a portal is defined as a frame structure (alternatively called a gate or threshold). The frame structure can be that of the radiation portal monitor itself or may be a separate frame of the neutron detection system through which the neutrons enter the radiation portal monitors. Although in context of some of the embodiments of the present invention, the capability of radiation portal monitors in detecting radiation from an object passing by the portal is considered as an advantage, it is in no way limiting the capability of the radiation portal monitor embodiments of the present invention in detecting nearby and stationary objects.

The portal 11 has a substantially large neutron collection portal area 12. The neutron collection portal area is the area defined by the portal 11 through which the neutrons enter the neutron-sensitive radiation portal monitor. Therefore, in one embodiment, the neutron collection portal area 12 generally defines a large area and is configured to receive incoming neutrons from a monitored neutron source 16 such as commercial freight. In one embodiment, the neutron collection portal area 12 is greater than about 0.5 m$^2$. In another embodiment, the neutron collection portal area 12 is greater than about 1 m$^2$. The radiation portal monitors 14 and the neutron detection system 10 can be portable or stationary. In one embodiment, the radiation portal monitor 14 is stationary at the time of detecting the neutrons from a monitored source 16. In one embodiment, the neutron detection system 10 is configured for real time detection and identification of nuclear and radioactive materials and can be adapted to screen people, load-carrying trucks, trains, watercraft, or other stationary or moving objects. In one embodiment, the monitored source 16 is a commercial freight.

Figure 2:
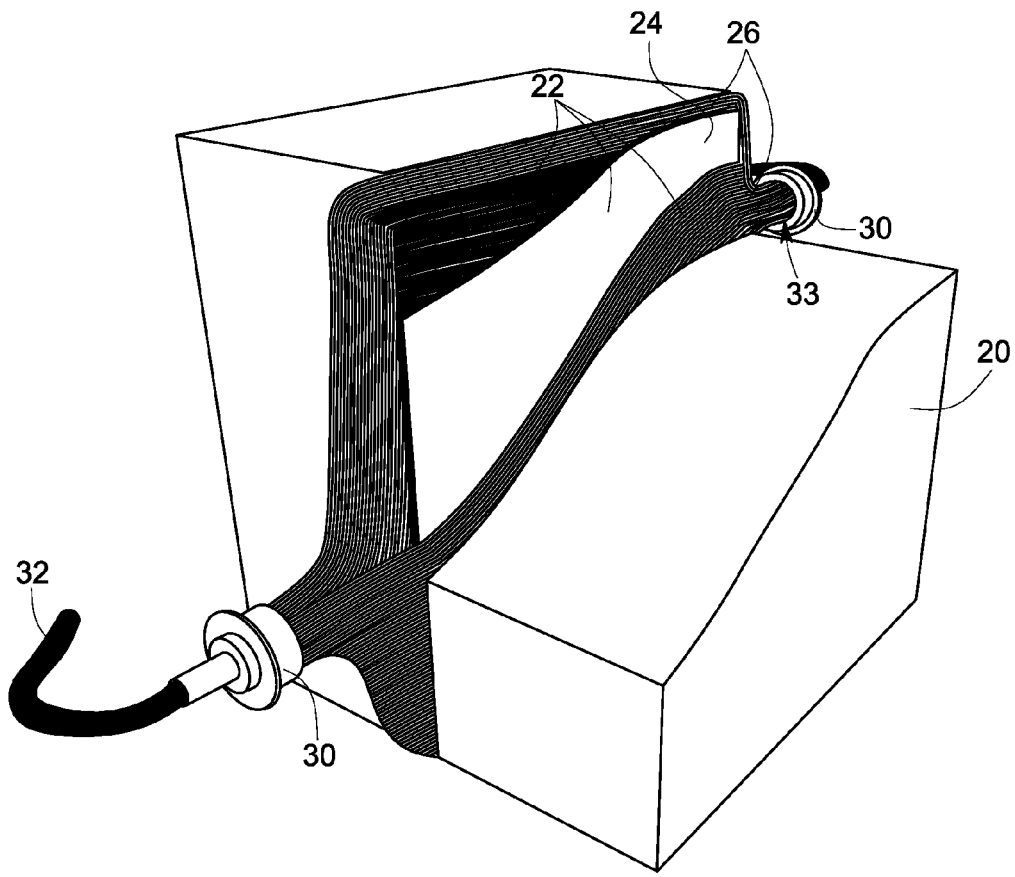
FIG. 2 is a sectional, three-dimensional view of a radiation portal monitor in accordance with one embodiment of the invention.
Figure 3:
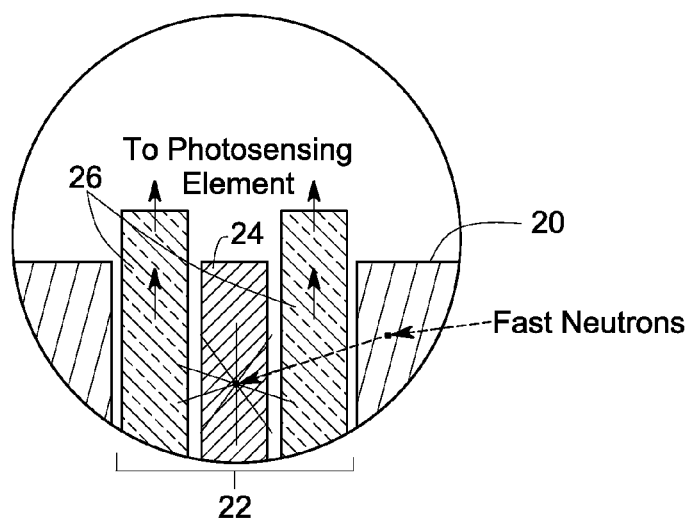
FIG. 3 is a diagrammatical representation of a neutron-sensing material and optical fiber in accordance with one embodiment of the invention.

FIG. 2 depicts a sectional, three dimensional view and FIG. 3 depicts a cross-sectional view of a part of the radiation portal monitor 14 in accordance with one embodiment of the invention. The radiation portal monitor includes a neutron moderator sheet 20 and a neutron-sensing panel 22. The neutron-sensing panel 22 comprises a neutron-sensing material 24 that is optically coupled to a plurality of optical fibers 26. The neutron-sensing material 24 may comprise, for example, a mixture of particles of a neutron-capture material and a scintillator material. For example $^6$Li in a chemical compound form such as $^6$LiF can be used as a neutron-capture material and a zinc sulfide based phosphor can be used as a scintillator material. Upon absorption of a thermal neutron, $^6$Li decays into a $^3$H (triton) and alpha particle, with no other secondary radiation. Both charged particles have a total kinetic energy of about 4.8 MeV. The alpha particle and the triton are absorbed by the scintillator material, such as for example, ZnS:Ag, which emits a 450 nm photon having a decay time, τ, of about 110 nanoseconds.

One important metric in determining the performance of a neutron-sensing material 24 is neutron sensitivity, the number of neutron events registered per incoming neutron flux. Suitable materials for use as neutron-capture materials are those materials with high neutron-capture cross sections that are able to generate high-energy particles as a result of the nuclear reaction. As employed herein, a "high" neutron-capture cross section refers to a thermal neutron absorption capture cross-section of at least about 100 barns. Although the present disclosure is not limited, an exemplified neutron-capture component comprises lithium-6 fluoride. It is a stable compound with a high Li content, and is substantially insoluble in water and common organic solvents. The thermal neutron-capture cross section for $^6$Li for the (n,α) reaction is about 940 barns, and its neutron-capture reaction is as follows:

$$^6\text{Li}+^1n \rightarrow ^3\text{H}+^4\alpha (Q=4.78 \text{ MeV})$$

where $Q=E(^3\text{H})+E(^4\alpha)$

This direct conversion of captured neutron to charged particles such as alpha particles and tritons is advantageous for applications where it is desired to detect neutron flux independently of the presence of gamma radiation.

In some embodiments, the scintillating material comprises one or more materials selected from metal oxide, metal sulfide, metal selenide, metal oxysulfide, mixed metal oxide, metal halide, and the like, and mixtures thereof, in pure or doped form. In certain embodiments, the scintillating material brightly scintillates upon being impinged by one or more of a proton, an alpha particle, a beta particle, a fission fragment, or a deuterium or tritium nuclide. In certain embodiments the scintillating material does not fluoresce under gamma irradiation. The terms "bright scintillation" or "brightly scintillate" refer to a value of at least about 400 photons/MeV, and preferably at least about 4000 photons/MeV.

It will be appreciated that the invention is not limited to using $^6$LiF/ZnS:Ag as the neutron-sensing material 24, and that other neutron capturing and scintillating materials may be disposed in the neutron-sensing material 24. The neutron-sensing material 24 may also include compositions in which both the neutron-capture and scintillating functions are embodied within a single composition (i.e., not two as in the case of $^6$LiF and ZnS:Ag).

In one embodiment, the neutron-sensing material comprises a binder material for binding the neutron capturing material and scintillating materials together. The neutron capturing material and scintillating materials can be in powder form and can be intimately mixed for achieving higher proximity to each other thereby increasing the efficiency of scintillation. As used herein, an "intimate mixture" of the named components refers to a homogeneous mixture where crystallites of the inorganic scintillating component are in direct contact with crystallites of the neutron-capture component. The binder material also has to present sufficient optical transparency for the scintillation light. As used herein, "transparency" means "optical transparency" and refers to a binder composition having light transmittivity of at least about 90% at the emission wavelength of the scintillating component.

In certain embodiments, it is advantageous that the neutron-sensing material 24 be substantially transparent to incoming gamma radiation and be gamma-ray insensitive. In this disclosure, "gamma-ray-insensitive" refers to the neutron-sensing material 24 having substantially non-fluorescent characteristic in the presence of gamma radiation. The term "substantially non-fluorescent" herein refers to a value less than about 10$^{-7}$ gamma rays resulting in fluorescence.

In an embodiment, the optical fibers 26 may be made of, for example, fused/glassy silica, transparent plastic, and the like. In one embodiment, depending on the required application, the optical fibers 26 also comprise wavelength-shifting fibers that will shift wavelength of the emitted radiation for enhanced transmission or detection.

In one embodiment, the neutron-sensing material 24 is disposed in the form of a sheet and called a neutron-sensing sheet 24. Thickness of the neutron-sensing sheet can vary depending on the application. In one embodiment, the thickness of the neutron-sensing sheet is less than 1 mm. In one embodiment, the optical fibers 26, as depicted in FIG. 2, are arranged in the form of a planar array to form optical fiber sheets and disposed on both sides of the neutron-sensing sheet. The neutron-sensing material is optically coupled to the optical fibers 26 of the optical fiber sheet. The term "optical coupling" herein refers to the optical communication between the neutron-sensing material and the optical fibers. Typically the optical fibers capture at least some of the photoradiation emitted by the neutron-sensing material 24. In one embodiment, the optical fibers are side-coupled to the neutron-sensing sheet. As used herein, the term "side coupled" means that the optical fibers are configured to receive the photo-radiation coming out from the neutron-sensing sheet 24 through the sides of the optical fibers.

In one embodiment, the neutron-sensing sheet comprises a plurality of neutron-sensing material filaments. As used herein the filaments can be solid strands or hollow fibers. One or more layers of neutron-sensing material filaments may be used to form the neutron-sensing sheet. A binder, for example such as epoxy, can be used to hold the neutron-sensing material filaments together in the form of a sheet. The neutron-sensing panel 22 can utilize one or more modes of collecting and carrying the scintillating radiation out of the neutron-sensing sheet 24. For example, in one embodiment, the neutron-sensing sheet 24 is made up of the neutron-sensing material filaments using epoxy as the binder and the scintillating radiation coming out of the neutron-sensing sheet is channeled using the side coupled optical fibers 26 disposed on the sides of the neutron-sensing sheets. In another embodiment, the neutron-sensing sheet 24 may further comprise an optical waveguide material 28 that can assist in channeling the scintillating radiation out of the neutron-sensing sheet as described in the later sections of this application.

The radiation portal monitor 14 includes a neutron moderator sheet 20 that includes a material that slows down fast neutrons entering the moderator sheet 20. The neutron moderator sheet 20 can have different shapes and sizes according to the performance requirements of the radiation portal monitor 14. Generally, the neutron moderator sheet 20 receives both the fast and slow neutrons from the neutron source 16 through the neutron collection portal area 12. Therefore, in one embodiment, the neutron-sensing panel 22 is disposed behind the neutron moderator sheet 20 to receive the incoming neutrons from the neutron source 16 so that the neutrons first pass through the neutron moderator sheet 20 and then impinge upon the neutron-sensing panel 22. In another embodiment, the neutron-sensing panel 22 is disposed between two or more neutron moderator sheets 20 as shown in FIG. 2 and FIG. 3.

In one embodiment, to capture the maximum number of neutrons passing through the portal 12, the neutron moderator sheet 20 and the neutron-sensing panel 22 are disposed substantially parallel to the neutron collection portal area 12. The term "substantially parallel" herein means that the neutron collection portal area 12, the neutron moderator sheet 20, and the neutron-sensing panel 22 are within an angle of up to about 25 degrees from one another.

Materials of the neutron moderator sheet 20 may include any materials that are able to slow down fast neutrons without fully absorbing them. Hydrogen, water and some polymers can be used as effective neutron moderator materials. In one embodiment, the neutron moderator sheet 20 includes a polyethylene material.

In one embodiment, the neutron-sensing panel 22 comprises a plurality of sheets of alternating neutron-sensing material (neutron-sensing sheet) 24 and optical fibers 26. The sheets of neutron-sensing material 24 and optical fibers 26 are disposed in the neutron-sensing panel 22 such that the neutron-sensing panel 22 is substantially parallel to the neutron collection portal area 12. However, it will be appreciated that the invention is not limited to a particular configuration for the neutron-sensing panel 22 and that many possible configurations for the neutron-sensing panel 22 are within the scope of the invention. It will also be appreciated that the invention is not limited by the number and thickness of the alternating sheets of optical fibers 26 and neutron-sensing material 24, and that the number and thickness of the sheets can be varied as needed. For example, the neutron-sensing panel 22 may comprise only three sheets of material, e.g., a sheet of neutron-sensing material 24 disposed between two sheets of optical fibers 26. It will also be appreciated that the invention is not limited by the use of alternating sheets of sensing material 24 and optical fibers 26, and that the invention can be practiced with non-alternating sheets of neutron-sensing material 24 and optical fibers 26.

As described above, the interaction of the alpha particle and triton with the scintillator material, such as ZnS:Ag, provides for photon emission from the neutron-sensing material 24. The detection system 10 also includes a photosensing element 30 or array of photosensing elements, such as a photodiode or photomultiplier tube (PMT), and the like, which is optically coupled to the neutron-sensing panel 22 and can be connected to external analyzing equipment through the cable 32. It will be appreciated that the invention can be practiced with any suitable photosensor acting as the photosensing element, and that the use herein of the photodiode or PMT as a photosensor is merely illustrative and non-limiting. The photosensing element 30 outputs a signal, S, indicative by its decay time characteristic of the scintillation photons emitted by the neutron-sensing panel 22. In one embodiment, the photo-sensing element 30 has a finite detection window area 33. In a further embodiment, the detection window area 33 of the photo-sensing element 30 is less than 10% of the neutron collection portal area 12.

Although in the illustrated embodiment the neutron detection system 10 includes an array of photodiodes as the photosensing element 30, the detection system 10 may comprise other photosensitive devices. For example, other embodiments of the detection system 10 may include a photomultiplier tube, a PIN photodiode, an avalanche photodiode, a Geiger-mode operating photodiode, a hybrid photodetector and other similar devices, operating either individually or grouped as an array. In short, the photosensing element 30 is designed to receive and interpret scintillation light signal from the neutron sensor element 20. To interpret such signals, the detection system 10 may also include a pulse shaping and processing electronics package (not shown) of a type well-known in the art that processes the signal, S, from the photosensing element 30.

As shown in the exemplary embodiment of FIGS. 2 and 3, both sides of the neutron-sensing material 24 are surrounded by and optically coupled to optical fibers 26, which are bundled together and carry the light to the photo-sensing elements 30. The photo-sensing element 30, which is optically coupled with the neutron-sensing panel 22, then detects the scintillation photons as generated by a neutron event. For each neutron interaction with neutron-sensing material 24, the photo-sensing elements 30 receive a pulse of light through the optical fibers 26 and convert optical photons into an electrical signal. Essentially, the invention allows counting with high efficiency the flux of neutrons presented to radiation portal monitors. The module sensitivity is proportional to the area of neutron-sensing sheet exposed. The manufacturing process for this sheet can be readily scaled based on the portal size specification. The invention allows counting neutrons with high efficiency using an integrated module with scalable area of coverage.

To enhance internal reflection of the photons, material of the optical fibers 26 may have a refractive index greater than that of the neutron-sensing material 24. If needed, the surfaces of the optical fibers 26 may be coated with a thin reflective layer (not shown) to induce a "one-way mirror" effect to improve internal reflection. The optical fibers 26 may also have a very high transmission (>90%) at the wavelength of the neutron-sensing material 24. It is appreciated that the thickness of the optical fibers 26 and the thickness and diameter of the sheet of neutron-sensing material 24 can be optimized to maximize the amount of photons collected by the optical fibers 26 to be ultimately interpreted as an event.

Figure 4:
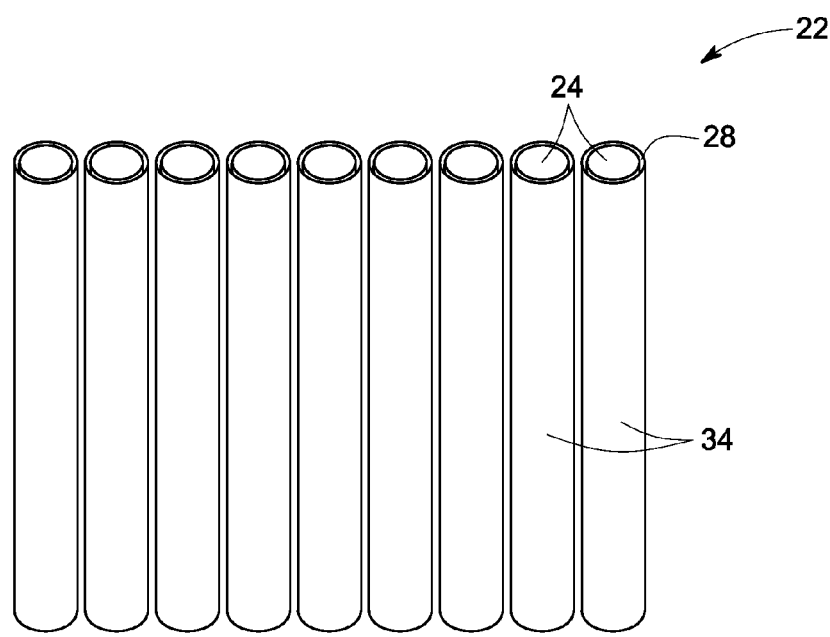
FIG. 4 is a schematic representation of a neutron-sensing sheet formed by neutron-sensing material and optical waveguides in accordance with one embodiment of the invention.

Referring now to FIG. 4, another configuration of the neutron-sensing panel 22 of the detection system 10 is shown. In this embodiment, the neutron-sensing panel 22 comprises a plurality of filaments 34 with the neutron-sensing material 24 enclosed by an annular or tubular optical waveguide material 28. This embodiment does not necessarily require a separate sheet of optical fibers 26 to capture the photons. Because the optical waveguide material 28 surrounds the neutron-sensing material 24, the photon emitted by the neutron-sensing material 24 is collected and channeled to the end of the optical waveguide material 28. The photons collected by the optical waveguide material 28 can be either directly fed into the photosensing element 30 or can be transferred to the photosensing element 30 by face coupling (not shown) the optical waveguide material 28 to the optical fiber 26 part of the neutron-sensing panel 22. The filaments 34 are aligned in the neutron-sensing panel 22 so as to be substantially parallel to the neutron collection portal area 12. It will be appreciated that the invention is not limited by the number of sheets or filaments to form the neutron-sensing panel 22, and that the invention can be practiced with an optimal number of sheets and filaments for photon collection and transmission to the photosensing element 30.

Figure 5:
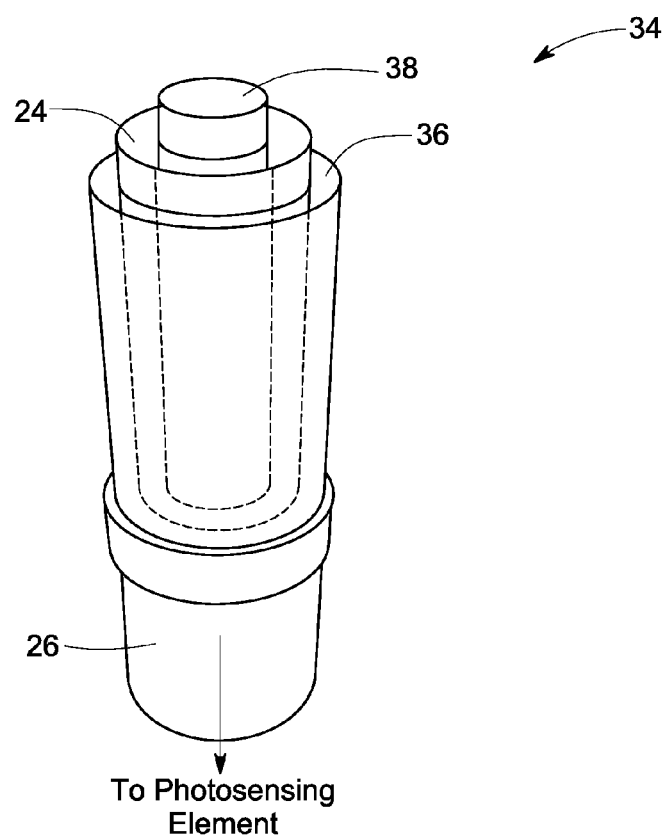
FIG. 5 is a schematic representation of a filament of neutron-sensing material and optical waveguide in accordance with one embodiment of the invention.

FIG. 5 shows a variation of the filaments of FIG. 4. In this embodiment, each filament 34 of the neutron-sensing panel 22 comprises an outer, cylindrical shell 36 and an innermost concentric solid "core" 38 of optical waveguide material, wherein a neutron-sensing material 24 is disposed between the shell 36 and core 38. One or more sheets formed by such filaments can be used as the neutron-sensing panel 22 and the photons collected by the shell and core of different optical waveguide materials 28 can be captured and fed either directly or through the optical fiber 26 part of the neutron-sensing panel 22 into the photosensing element 30. However, it should be understood that the invention is not limited to the described configurations of the neutron-sensing panel 22 of FIG. 4 and FIG. 5, and that many configurations are within the scope of the invention.

One of the intended applications of the neutron detection system 10 is in passive neutron detection for interdiction of nuclear materials, in combination with existing gamma detectors present in advanced radiation portal systems for cargo and vehicle screening. Embodiments of the neutron detection system of the present invention can use the same or similar types of photosensors as the gamma ray detectors in existing radiation portals and hence are easily deployable in combination with the gamma ray detectors without the need of many additional photosensors or different front-end processing electronic modules. The neutron detection technique proposed here does not create secondary gamma rays that would otherwise appear as a spurious signal in the gamma detectors present in a radiation portal system. The present invention offers a cost-effective alternative to $^3$He gas proportional counters. In one embodiment, the neutron-sensing material has only solid components (no gases or liquids) and therefore does not have any toxicity and does not require any high-pressure containers. Considering the lower thickness of the neutron-sensing sheets, the neutron-sensing sheet with solid neutron-sensing materials has a low probability of interaction with gamma rays, unlike liquid neutron-sensing materials. Further, the neutron-sensing sheet used in the present invention has increased resistance to radiation damage over single-crystal neutron scintillator materials. By employing the present design, the manufacturing steps are simplified, easily scalable, and the cost of manufacture reduced.

In one particular application, the output of the neutron detection system 10 will be a neutron count rate indication or measure. In a scenario where the indicated rate is higher than the neutron background rate by a statistically significant factor, the radiation portal will alert operators to the presence of nuclear materials. For example, in a typical shipment of nuclear fuel containing about 2700 kg of natural or low enrichment uranium, the neutron emissions will be over about 37,000 fast neutrons per second (as described in R. T. Kouzes, E. R. Siciliano, J. H. Ely, P. E. Keller, R. J. McConn, "Passive neutron detection for interdiction of nuclear material at borders", Nuclear Instruments and Methods in Physics Research Section A: Accelerators, Spectrometers, Detectors and Associated Equipment 584 (2008) page 384). With a neutron collection portal area of about 1 m$^2$, with a polyethylene neutron moderator, and an intrinsic thermal neutron-capture efficiency of 90%, the total neutron event rate at a portal embodiment may be greater than 500 counts per second, which is well above the normal neutron background of about 40 and 200 neutrons/m$^2$ per second reported in the literature (ibid. pages 386-387).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A neutron detection system, comprising:
 a radiation portal monitor configured to receive incoming neutrons through a neutron collection portal area and comprising:
 a neutron moderator sheet; and
 a neutron-sensing panel comprising a plurality of neutron-sensing material filaments optically coupled to a plurality of optical fibers; wherein
 the neutron moderator sheet and the neutron-sensing panel are disposed substantially parallel to the neutron collection portal area.

2. The system of claim 1, wherein the neutron collection portal area is substantially perpendicular to the incoming neutrons from a monitored neutron source.

3. The system of claim 1, wherein the neutron collection portal area is greater than 0.5 m$^2$.

4. The system of claim 1, wherein the neutron-sensing material comprises a scintillating material.

5. The system of claim 1, wherein the neutron-sensing material consists essentially of solid materials.

6. The system of claim 1, wherein the neutron-sensing material comprises $^6$Li-enriched lithium fluoride and a mixture of zinc sulfide based phosphor.

7. The system of claim 1, wherein the neutron-sensing material is disposed in the form of a neutron-sensing sheet.

8. The system of claim 7, wherein the thickness of the neutron-sensing sheet is less than 1 mm.

9. The system of claim 7, wherein the plurality of optical fibers are side-coupled to at least one side of the neutron-sensing sheet.

10. The system of claim 1, wherein the plurality of neutron-sensing material filaments are enclosed by an annular or tubular optical waveguide material.

11. The system of claim 1, wherein the system further comprises a photo-sensing element optically coupled to the optical fibers and having a finite detection window area.

12. The system of claim 11, wherein the detection window area of the photo-sensing element is less than 10% of the neutron collection portal area.

13. The system of claim 1, wherein the neutron detection system is gamma ray insensitive.

14. The system of claim 1, further comprising wavelength shifting fibers.

15. The system of claim 1, wherein a surface of the optical fiber is coated with a reflective layer to improve internal reflection.

16. A neutron detection system, comprising:
   a radiation portal monitor configured to receive incoming neutrons through a neutron collection portal area and comprising:
      a neutron moderator sheet;
      a neutron-sensing panel comprising neutron-sensing material filaments enclosed in an annular or tubular optical waveguide material; and
      a photo-sensing element optically coupled to the optical waveguide material,
   wherein the neutron moderator sheet and the neutron-sensing panel are disposed substantially parallel to the neutron collection portal area.

17. The neutron detection system of claim 16, wherein a refractive index of the optical waveguide material is greater than that of the neutron-sensing material.

\* \* \* \* \*